US009459354B2

(12) United States Patent
Chen

(10) Patent No.: US 9,459,354 B2
(45) Date of Patent: Oct. 4, 2016

(54) METHOD FOR CAR RELOCATION

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

(*) Notice: Subject to any disclaimer, the term of this patent is extended or adjusted under 35 U.S.C. 154(b) by 48 days.

(21) Appl. No.: 14/318,657

(22) Filed: Jun. 29, 2014

(65) Prior Publication Data
US 2015/0378029 A1  Dec. 31, 2015

(51) Int. Cl.
| G01S 19/42 | (2010.01) |
| G06K 9/00 | (2006.01) |
| G01C 21/36 | (2006.01) |
| H04W 4/04 | (2009.01) |
| G01S 5/00 | (2006.01) |

(52) U.S. Cl.
CPC ........... *G01S 19/42* (2013.01); *G01C 21/3608* (2013.01); *G01S 5/0027* (2013.01); *G06K 9/00664* (2013.01); *H04W 4/04* (2013.01)

(58) Field of Classification Search
CPC . G01S 19/42; G01S 5/0027; G06K 9/00664; H04W 4/04; G01C 21/3608
USPC ........................................................ 701/488
See application file for complete search history.

(56) References Cited

U.S. PATENT DOCUMENTS

2006/0092002 A1* 5/2006 Finkelstein ............. B60R 25/24
340/426.19
2012/0299754 A1* 11/2012 Korn ...................... G01C 21/00
340/990

OTHER PUBLICATIONS

"The 10 Best Car Apps for Smartphones" Takahashi, Mark; Nov. 4, 2013; Edmunds; http://www.edmunds.com/car-reviews/features/the-10-best-car-apps-for-smartphones.html.*

* cited by examiner

*Primary Examiner* — Brian P Sweeney
(74) *Attorney, Agent, or Firm* — Guice Patents PLLC

(57) ABSTRACT

A method for car relocation is disclosed. The method is to transmit the ID of a mobile device to a network server, after the engine of a car is turned on. After the engine of the car is turned off, the automobile device or the mobile device transmits GPS coordinate data to the network server via a wireless method. If the automobile device or the mobile device fails to receive the GPS coordinate, the screen of the automobile device will display a frame showing the place where the car is parked, and transmit the related data. By means of the operation of the buttons of the frame, the related data can be transmitted to the network server by the automobile device or the mobile device via the wireless method, and the network server will store related data to overwrite original data.

7 Claims, 7 Drawing Sheets

METHOD FOR CAR RELOCATION

BACKGROUND OF THE INVENTION (a) Field of the Invention

The present invention generally relates to a method for car relocation. The method is to report data to a network server via an automobile device and a mobile device to expand the functions of the mobile device, such that the overall functions of the automobile device and the mobile device can be effectively improved.

(b) Description of the Prior Art

Currently, smart phone is a very popular electronic device. In general, blue tooth and WI-FI are used as the connection interface between automobile devices and smart phones to play music or hand-free phone.

With the advance of wireless network and mobile devices, dedicated micro applications (App) for automobile devices to connect to smart phones are developed to expand functions or connect to other devices. Further, an automobile device registering at a network server can transmit data to a corresponding mobile device via the network server. The connection method is very convenient for car owners; for example, if a car owner parked his car at a big parking lot or other strange places, the connection method can help the car owner find out his car as soon as possible. The related embodiments for car relocation can be referred to TW 1413949, TW 1371957, TW 487806, TW M366074, TW publication No. 200622071.

Among the above conventional car relocation technologies, some of the above conventional technologies are to store the data about the positions of cars in mobile devices without the support of the network, which is not convenient for users. Some of the above conventional technologies provide the connection to the network, but all of them have complicated operation; for example, the user may have to take his mobile device to open App to record the position and input the password when he gets off the car; besides, they cannot work without GPS signal. The above shortcomings will seriously influence the convenience of these devices.

SUMMARY OF THE INVENTION

In order to overcome the shortcomings of the prior art, the inventor keeps on carving unflaggingly through wholehearted experience and research to develop the present invention, which can effectively improve the defects described above. In other words, it is a primary objective of the present invention to provide a method for car relocation to make the functions of mobile devices more convenient in order to effectively improve the overall functions of automobile devices and the mobile devices.

To achieve the foregoing objective, the first embodiment of the present invention provides a method for reporting data to the network server via an automobile device and a mobile device. The method comprises at least the following steps: (a) after the automobile device detects the engine of a car is turned on, the automobile device connects to the mobile device and transmits the ID of the mobile device to the network server, and then the method proceeds to the next step; (b) after the automobile device detects the engine of the car is turned off, the automobile device or the mobile device transmits GPS coordinate data to the network server via a wireless method, and then the method proceeds to step (e), or proceeds to the next step if without the GPS coordinate; (c) the screen of the automobile device displays a frame showing the place where the car is parked, wherein the frame comprises a cancel button, a transmission button and a record button, if the cancel button is pressed, the method ends; if the record button is pressed, the method proceeds to the next step; (d) the automobile device starts to perform a sound recording, wherein if the transmission button is pressed, the sound recording ends, and recorded sound data are transmitted to the network server by the automobile device or the mobile device via the wireless method, and the method proceeds to the next step; and (e) the network server receives the data transmitted by the automobile device or the mobile device to overwrite original data.

In a preferred embodiment of the present invention, step (c) may further comprise the follow step: making a voice message, "please say the place where the car is parked", by the automobile device.

In a preferred embodiment of the present invention, step (c) may further comprise the follow step: displaying a dialog box showing a text message, "please say the place where the car is parked", by the automobile device.

In a preferred embodiment of the present invention, the wireless method may be 3G, 4G, 5G or WI-FI.

In a preferred embodiment of the present invention, the mobile device may be able to download the data stored in the network server.

In a preferred embodiment of the present invention, the method may further comprise a micro management application for car relocation, wherein the micro management application for car relocation may be installed on the mobile device.

In a preferred embodiment of the present invention, the method may further comprise a micro management program for car relocation, wherein the micro management program is able to be accessed by other people to search positions by modifying settings, and the password and the period of validity thereof is able to be set.

To achieve the foregoing objective, the second embodiment of the present invention further provides an method for car relocation for reporting data to a network server via a car relocation device, the car relocation device may comprise a host module, a GPS module, a wireless transmission module, a record module, a detection module and a display module. The method may comprise at least the following steps: (a) after the detection module detects the engine of a car is turned off, the display module displays the first frame of the received GPS coordinate, wherein the first frame has a first cancel button and a first transmission button, if the first cancel button is pressed, the method ends; if the first transmission button is pressed, the method proceeds to the next step; (b) the GPS module transmits the a current GPS coordinate to the network server via the wireless transmission module, and then the method proceeds to step (e), or proceeds to the next step if without the current GPS coordinate; (c) the display module displays a second frame showing the place where the car is parked, wherein the second frame may comprise a second cancel button, a second transmission button and a record button, if the second cancel button is pressed, the method ends; if the record button is pressed, the method proceeds to the next step; (d) the record module starts to perform the sound recording, wherein if the second transmission button is pressed, the sound recording ends, and recorded sound data are transmitted to the network server by the wireless transmission module, and the method proceeds to the next step; and (e) the network server receives the data transmitted by the wireless transmission module to overwrite original data.

In a preferred embodiment of the present invention, the car relocation device may further comprise an acoustic module, and the acoustic module may make a voice message, "please say the place where the car is parked" in step (c).

In a preferred embodiment of the present invention, the second frame may further comprise a dialog box showing a text message, "please say the place where the car is parked".

In a preferred embodiment of the present invention, the wireless transmission module and the network may communicate with each other by 3G, 4G, 5G or WI-FI.

In a preferred embodiment of the present invention, the mobile device can download the data stored in the network server.

In a preferred embodiment of the present invention, the method may further comprise a micro management application for car relocation, wherein the micro management application for car relocation may be installed on a mobile device.

In a preferred embodiment of the present invention, the method may further comprise a micro management application for car relocation, wherein the micro management application can be accessed by other people to search positions by modifying settings, and a password and a period of validity thereof can be set.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
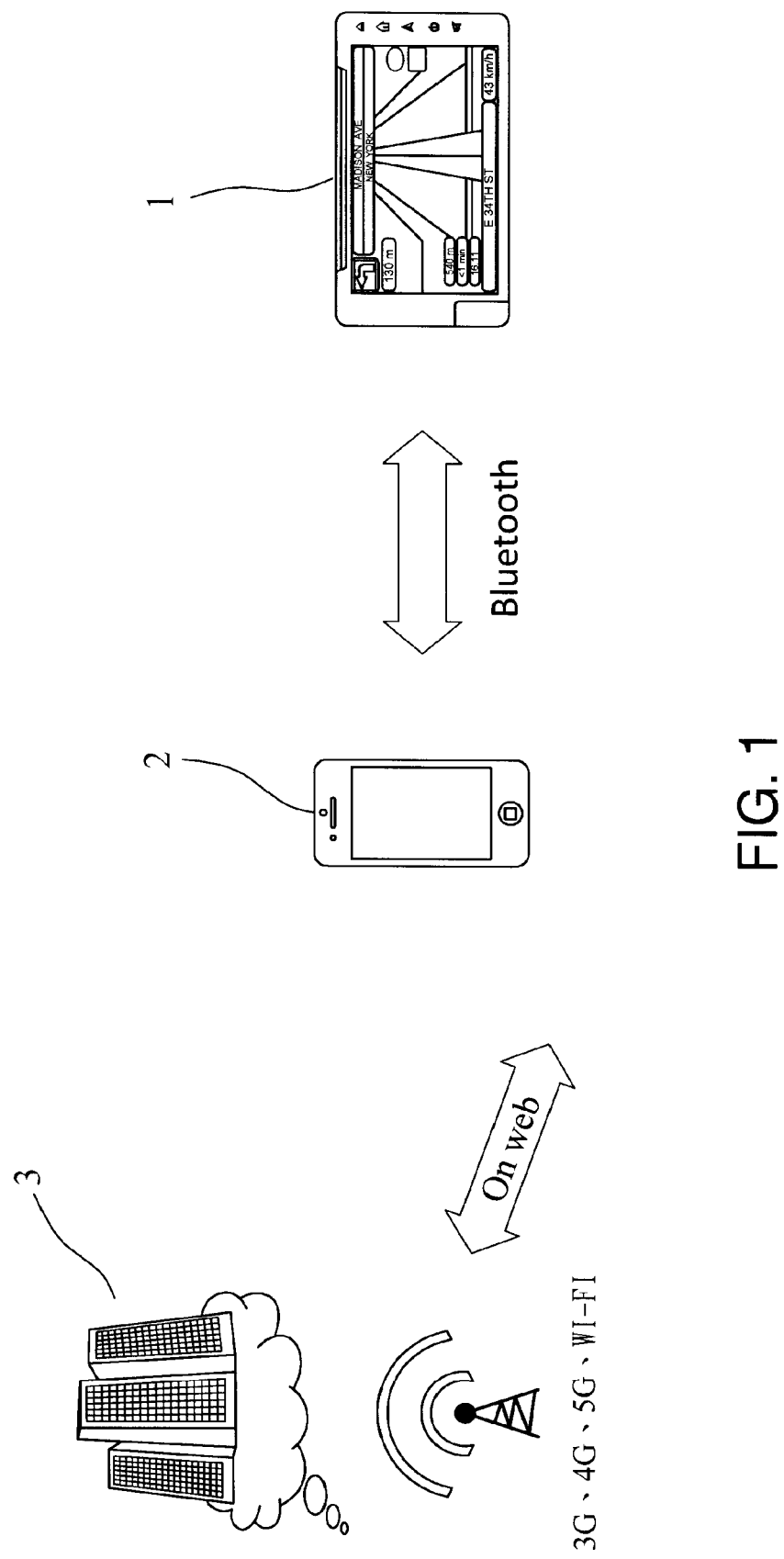
FIG. 1 is a system structure diagram of the first embodiment of the present invention.
Figure 2:
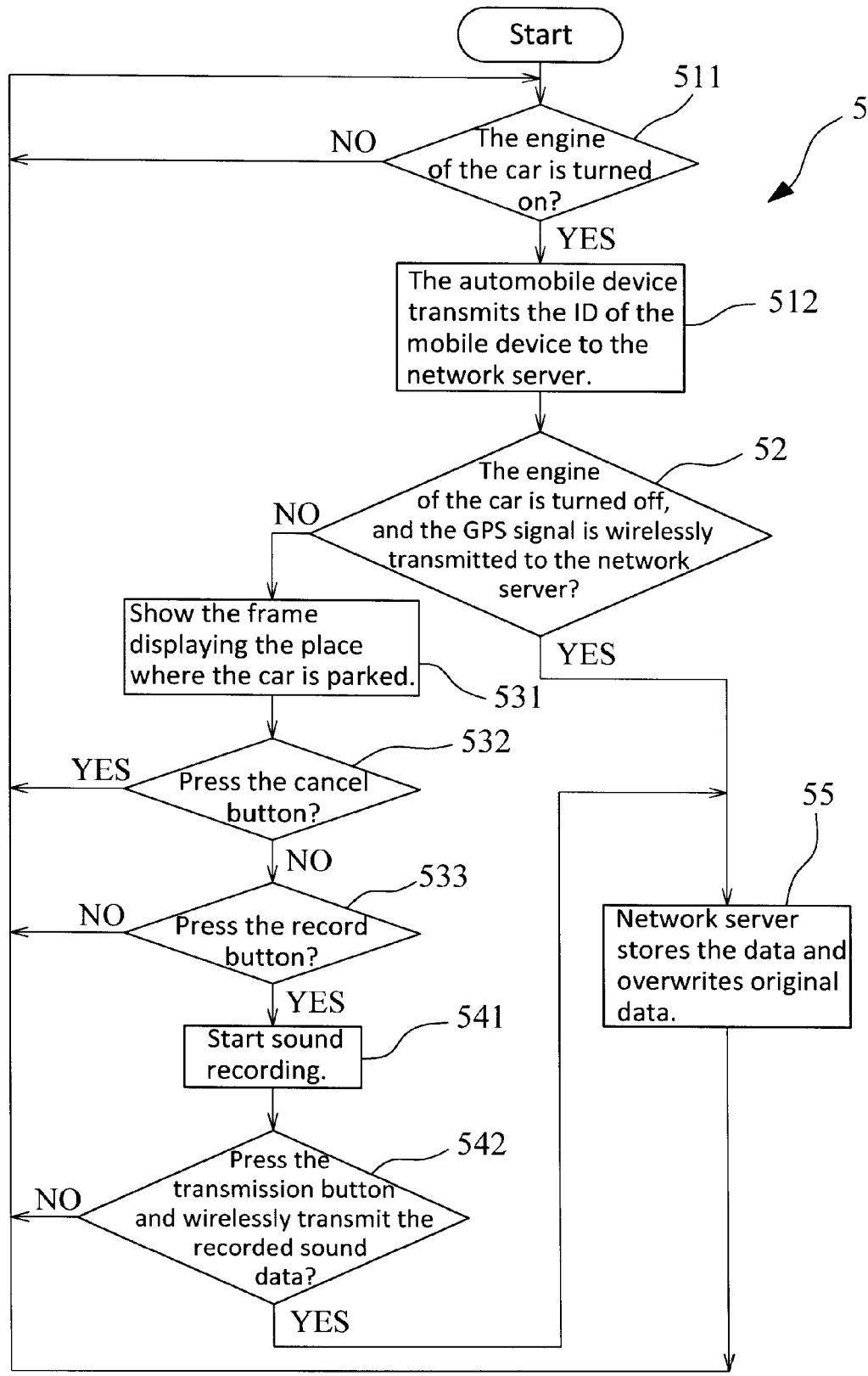
FIG. 2 is a flow chart of the first embodiment of the present invention.

With reference to FIG. 1 for a system structure diagram of the first embodiment of a method for car relocation in accordance with the present invention, the method is to report data to a network server 3 via an automobile device 1 and a mobile device 2. The method comprises at least the following steps (as shown in FIG. 2):

(a) After the automobile device detects the engine of a car turned on (step 511), the automobile device 1 will connect to the mobile device and transmit the ID of the mobile device 2 to the network server 3 (step 512), and then the method proceeds to the next step;

[In step (a), after the automobile device 1 detects ACC on from the car, the automobile device 1 will connect to the mobile device 2 and be paired to the Bluetooth device of the mobile device 2; afterward, the automobile device 1 will obtain the pairing data from the mobile device 2, such as the mac address and the phone number, where the two IDs will be used to connect the automobile device 1 and mobile device 2 later; the automobile device 1 will transmit the IDs of the mobile device 2 to the network server 3, and the method proceeds to step (b).]

(b) After the automobile device 1 detects the engine of the car is turned off, the automobile device 1 or the mobile device 2 transmits GPS coordinate data to the network server 3 via a wireless method (step 52), and then the method proceeds to a step (e), or proceeds to the next step if without the GPS coordinate;

[In step (b), after the automobile device 1 detects ACC off from the car, the automobile device 1 is still power-on, so the user can operate the automobile device 1. After a predetermined time interval, the automobile device 1 will be turned off, where the predetermined time interval can be 1 minute, 3 minutes or 5 minutes, and the user can adjust the settings of the automobile device 1 to modify the predetermined time interval. The automobile device 1 will detect the current GPS coordinate, and the automobile device 1 or the mobile device 2 will transmit the GPS coordinate data to the network server 3 via a wireless method, and then the method proceeds to step (e), or proceeds to step (c) if the automobile device 1 fails to detect the GPS coordinate. For instance, the car is parked at the basement of a building, and the automobile device 1 cannot receive GPS signal.]

Figure 3:
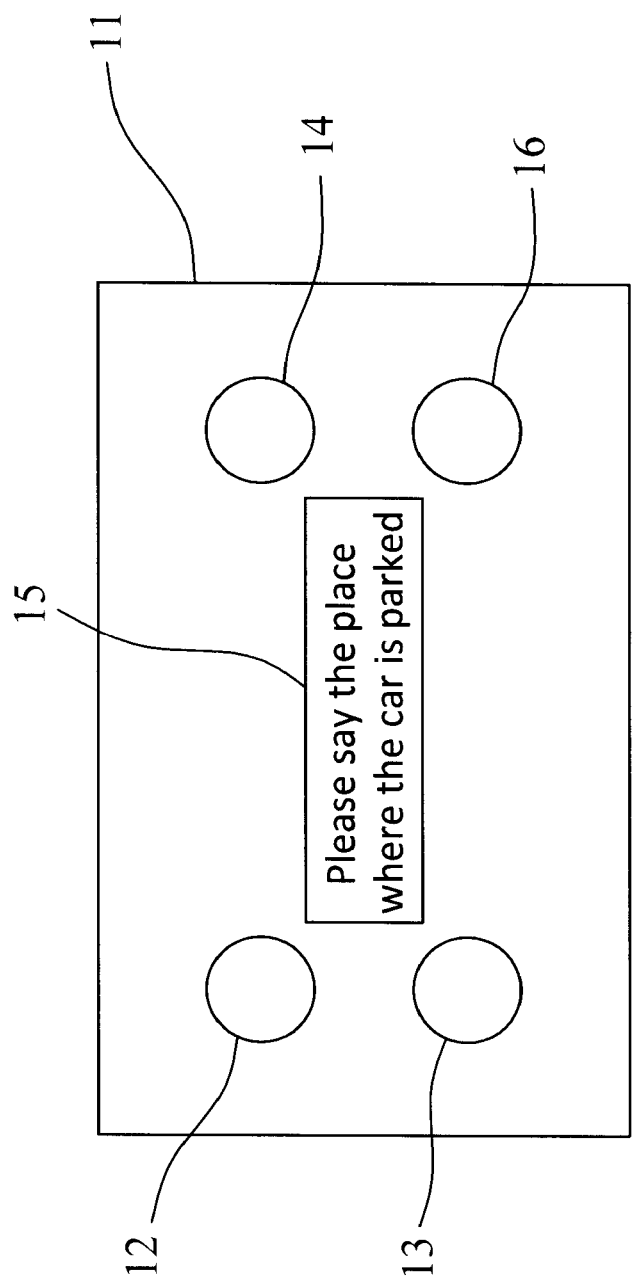
FIG. 3 is a schematic view of a frame displayed on a screen in accordance with the present invention.

(c) The screen of the automobile device 1 displays a frame 11 showing the place where the car is parked, wherein the frame 11 comprises three buttons, including a cancel button 12, a transmission button 13 and a record button 14 (as shown in FIG. 3), if the cancel button 12 is pressed (step 532), the method ends; if the record button 14 is pressed (step 533), the method proceeds to the next step;

[In step (c), as shown in FIG. 3, a frame displayed by the screen of the first embodiment, the screen of the automobile device 1 displays the frame 11 showing the place where the car is parked. The frame 11 has three buttons, including the cancel button 12, the transmission button 13 and the record button 14, if the user presses the cancel button 12, the method ends; if the user press the record button 14, the method proceeds to step (d);]

(d) The automobile device 1 starts to perform the sound recording (step 541), wherein if the transmission button 13 is pressed, the sound recording ends, and recorded sound data are transmitted to the network server by the automobile device 1 or the mobile device 2 via the wireless method (step 542), and the method proceeds to the next step;

[In step (d), the automobile device 1 starts to perform the sound recording to record the voice of the user; for example, the user says "B3, parking space D52". If the automobile device 1 has recorded the data that the user wants to record, the user can press the transmission button 13 to end the sound recording and transmit the recorded sound data to the network server 3 by the automobile device 1 or the mobile device 2 via the wireless method.]

(e) The network server 3 receives the data transmitted by the automobile device 1 or the mobile device 2 to overwrite original data (step 55).

[In step (e), the network server 3 receives the GPS coordinate data or recorded sound data transmitted by the automobile device 1 or the mobile device 2, and the network server 3 saves these data and overwrites the original data.]

The mobile device 2 can download the data stored in the network server 3, the user can find the place where he parked the car according to the downloaded data.

The mobile device 2 can be a smart phone or a tablet computer. The automobile device 1 can be a vehicle-mounted computer, a head up display, ceiling-installed multimedia playing device, headrest multimedia playing device or a hand-free phone device, etc.

The wireless method is 3G, 4G, 5G or WI-FI.

The frame 11 further comprises a dialog box 15 showing a text message, "please say the place where the car is parked", to instruct the user to say the place where he parked his car.

The automobile device 1 can further make a voice message, "please say the place where the car is parked", to instruct the user to say the place where he parked his car.

The frame 11 further comprises a "never record the position" button 16. If the user presses the button 16, the automobile device 1 or the mobile device 2 will transmit "never record the position" data to the network server 3.

The method for car relocation according to the present invention further comprises a micro management application for car relocation (find my car App), wherein the micro management application for car relocation is installed on the mobile device 2. When the mobile device 2, a mobile phone, starts the micro management application for car relocation, the mobile device 2 can download the data stored in the network server 3, so that the user can find our the place where he parked the car according to the downloaded data and the map.

The micro management application can be accessed by other people to search positions by modifying its settings, and the password and the period of validity thereof can be set. During the period of validity, the data stored in the network server 3 can be downloaded by inputting necessary data at the website of the network server 3 (such as the ID of the mobile device 2 or the number of the licensing plate) and password.

If the car is parked at the basement of a building, there will be no GPS signal. The prevent invention provides other compensation mechanisms to solve this problem. If not detecting GPS signal, the automobile device 1 will determine that the car is parked inside a building. When under ACC off, a warning voice message and a reminding screen, "please say the place where the car is parked", will pop up at the automobile device 1 to instruct the user to say the place where he parked the car. For example, "B3, parking space D52". Finally, the GPS coordinate data and recorded sound data will be transmitted to the network server 3. When the user starts the micro management application for car relocation of the mobile device 2, the application can not only transmit the GPS coordinate, but also can transmit voice file to the mobile device 2. After the user presses the button, the connected mobile device 2 (the last one connected mobile device 2) can download the place where the car was just parked without the need to input password. Further, other unauthorized mobile devices cannot find out the car; therefore, the present invention can also protect users' private information, which is very convenient for users.

Figure 4:
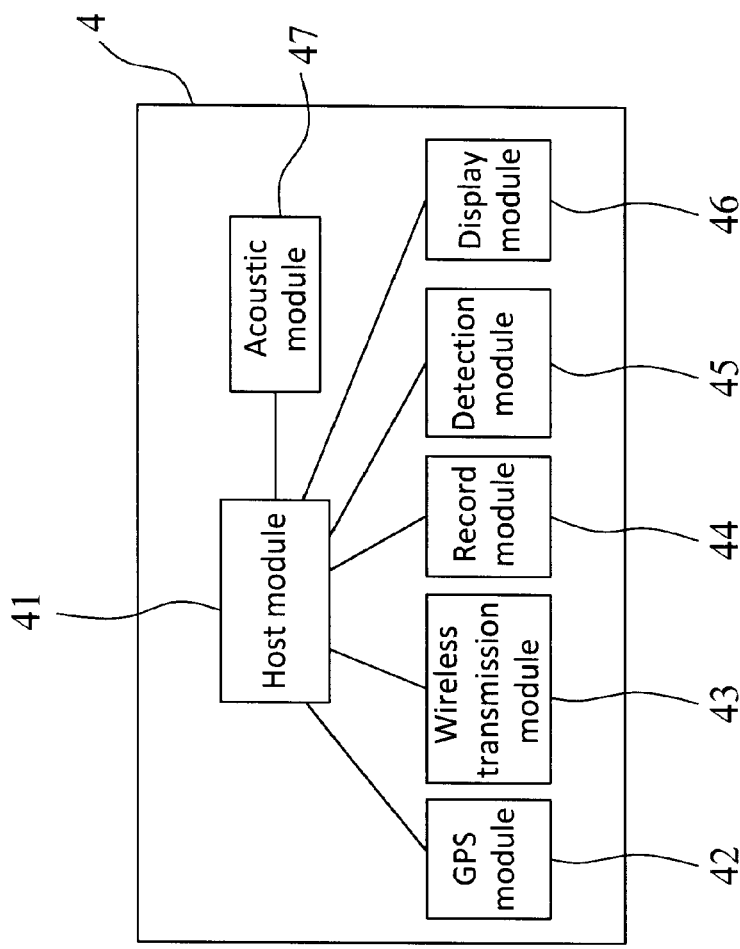
FIG. 4 is a system structure diagram of the second embodiment of the present invention.
Figure 4:
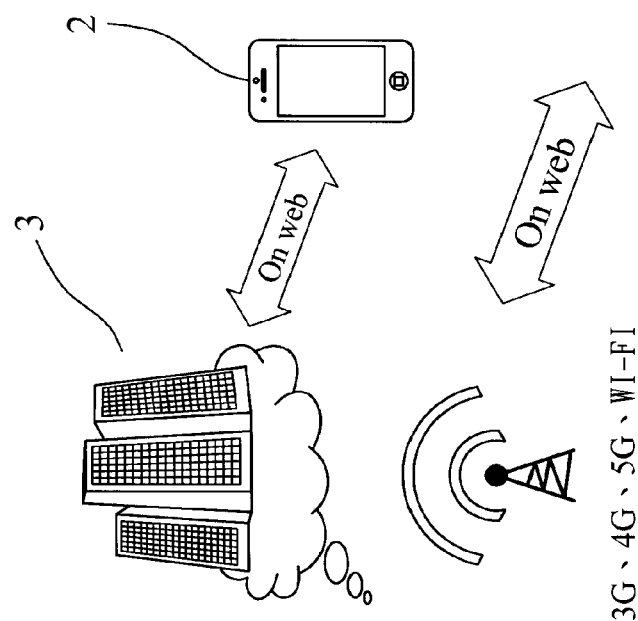
Figure 5:
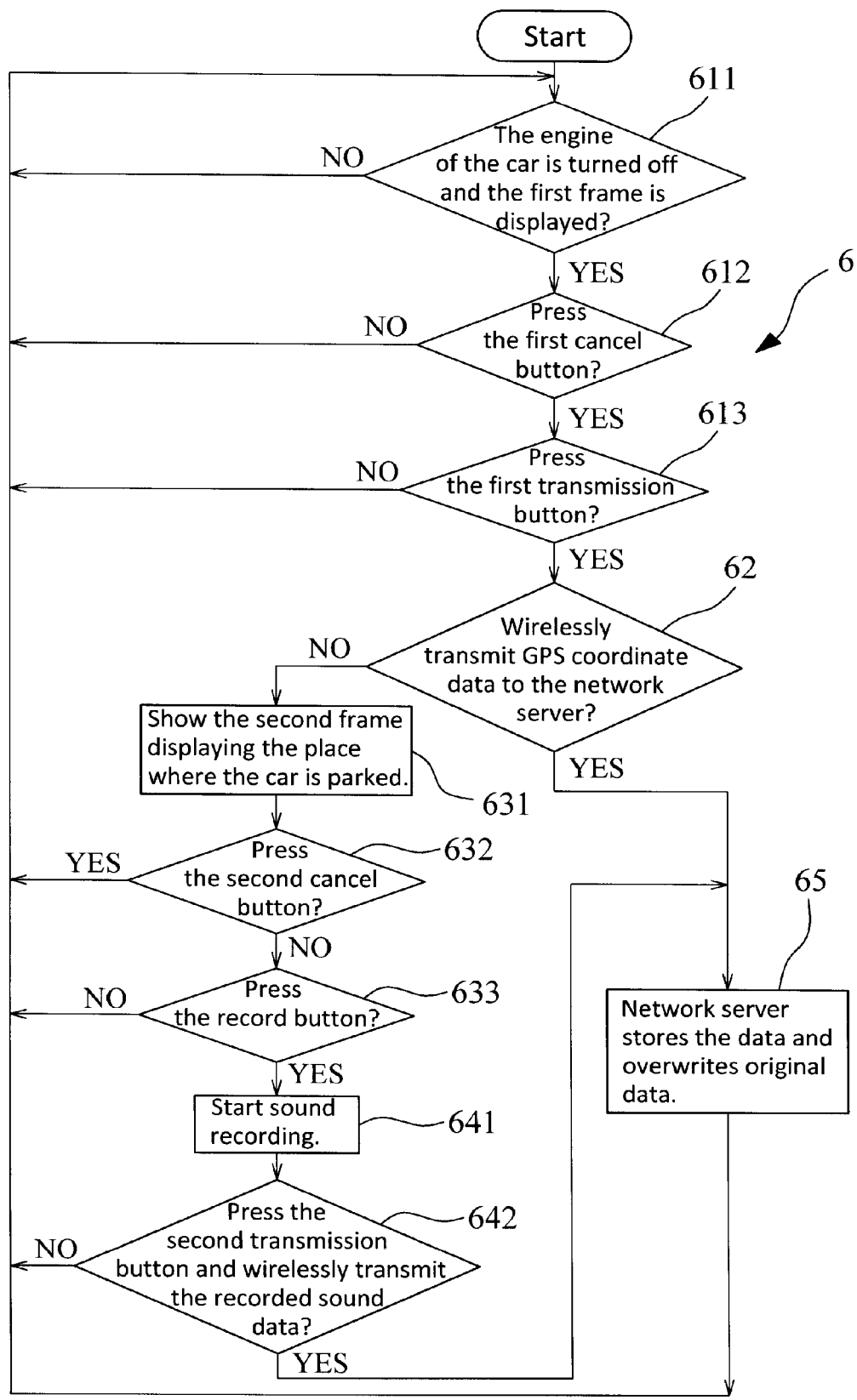
FIG. 5 is a flow chart of the second embodiment of the present invention.
Figure 6:
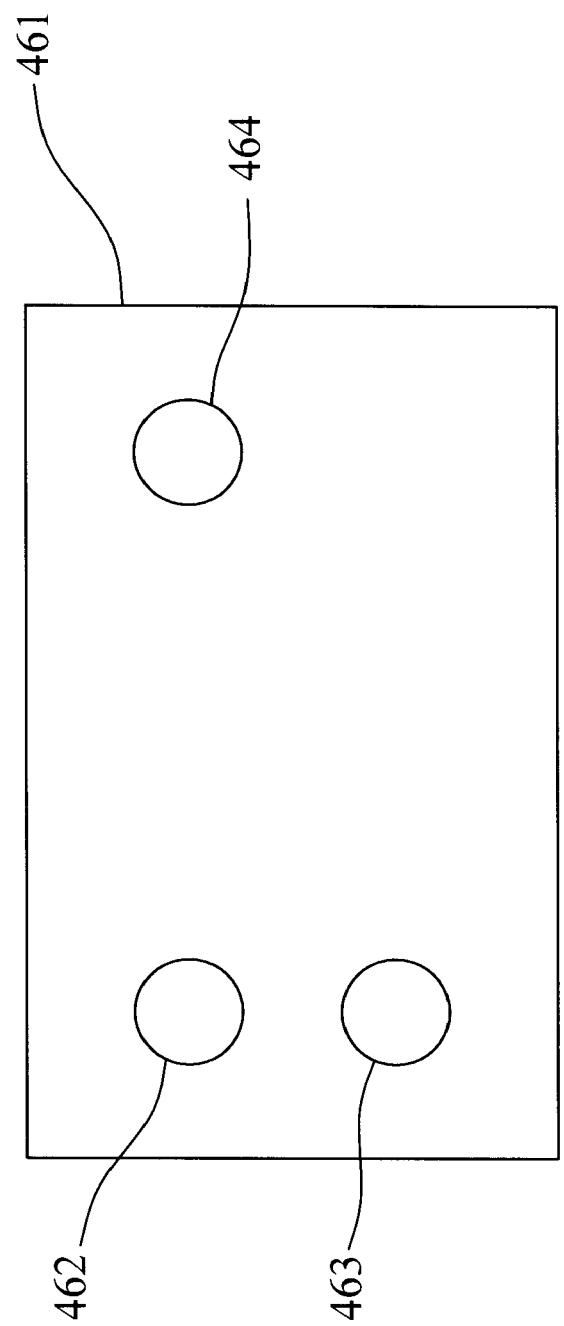
FIG. 6 is a schematic view of a first frame displayed on a screen of the second embodiment of the present invention.
Figure 7:
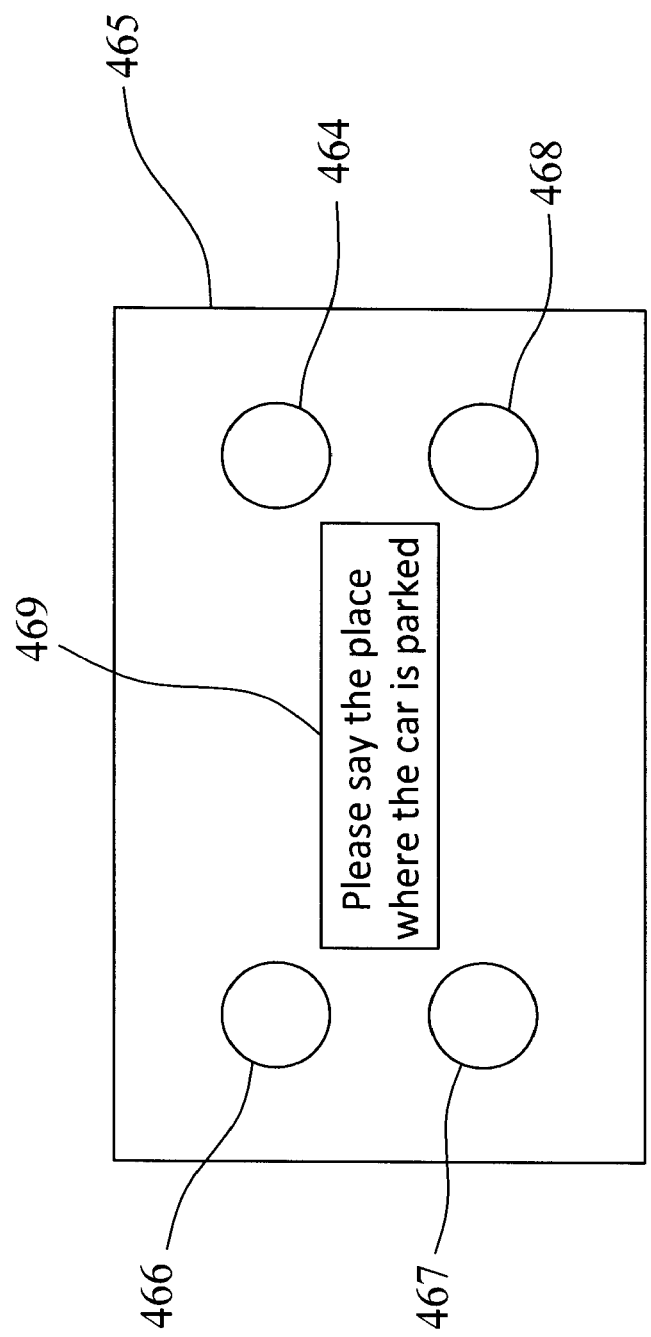
FIG. 7 is a schematic view of a second frame displayed on a screen of the second embodiment of the present invention.

With reference to FIG. 4 for a system structure diagram of the second embodiment of a method for car relocation in accordance with the present invention, the method is to report data to a network server 3 via a car relocation device 4. The car relocation device 4 comprises a host module 41, a GPS module 42, a wireless transmission module 43, a record module 44, a detection module 45 and a display module 46. The method for car relocation 6 of the car relocation device 4 comprises at least the following steps (as shown in FIG. 5):

(a) After the detection module 45 detects the engine of a car is turned off, the display module 46 will display a first frame 461 of a received GPS coordinate, wherein the first frame 461 has two buttons, including a first cancel button 462 and a first transmission button 463, if the first cancel button 462 is pressed (step 612), the method ends; if the first transmission button 463 (step 613) is pressed, the method proceeds to the next step;

[In step (a), after the detection module 45 detects ACC off from the car, the car relocation device 4 is still power-on, so the user can operate the car relocation device 4. After a predetermined time interval, the car relocation device 4 will be turned off, where the predetermined time interval can be 1 minute, 3 minutes or 5 minutes, and the user can adjust the settings of the car relocation device 4 to modify the predetermined time interval. As shown in the embodiment of FIG. 6, the first frame 461 for the display module 46 to display a received GPS coordinate is shown by the screen. The first frame 461 has two buttons, including the first cancel button 462, and the transmission button 463. If the user presses the first cancel button 462, the method ends; if the user presses the first transmission button 463, the method proceeds to step (b).]

(b) The GPS module 42 transmits the current GPS coordinate to the network server 3 via the wireless transmission module 43, and then the method proceeds to step (e), or proceeds to the next step if the GPS module 42 fails to receive the current GPS coordinate;

[In step (b), the GPS module 42 detects the current GPS coordinate of the car, and the wireless transmission module 43 transmits the current GPS coordinate data to the network server 3, and then the method proceeds to step (e), or proceeds to step (c) if the GPS module 42 fails to receive the current GPS coordinate. For instance, the car is parked at the basement of a building and the GPS module 42 cannot receive any GPS signal to locate the position of the car.]

(c) The display module 46 displays a second frame 465 showing the place where the car is parked (step 631), wherein the second frame 465 has three buttons, including a second cancel button 466, a second transmission button 467 and a record button 468, if the second cancel button 466 is pressed (step 632), the method ends; if the record button is pressed (step 633), the method proceeds to the next step;

[The display module 46 displays the second frame 465 showing the place where the car is parked. The second frame 465 has three buttons, including the second cancel button 466, the second transmission button 467 and the record button 468, if the user presses the second cancel button 466, the method ends; if the user presses the record button 468, the method proceeds to step (d).]

(d) The record module 44 starts to perform the sound recording (step 641), wherein if the second transmission button 467 is pressed, the sound recording ends, and recorded sound data is transmitted to the network server 3 by the wireless transmission module 43 (step 642), and the method proceeds to the next step;

[In step (d), the record module 44 starts to perform the sound recording to record the voice of the user; for example, the user says "B3, parking space D52". If the record module 44 has recorded the data that the user wants to record, the user can press the second transmission button 467 to end the sound recording and transmit the recorded sound data to the network server 3 by the wireless transmission module 43.]

(e) The network server 3 receives the data transmitted by the wireless transmission module 43 to overwrite original data (step 65).

[In step (e), the network server 3 receives the GPS coordinate data or recorded sound data transmitted by the wireless transmission module 43, and the network server 3 saves these data and overwrites the original data.]

The first frame 461 further comprises a "never record the position" button 644. If the user presses the button 644, the wireless transmission module 43 will transmit "never record the position" data to the network server 3.

The car relocation device 4 can be a vehicle-mounted computer, a head up display, ceiling-installed multimedia playing device, headrest multimedia playing device or a hand-free phone device, etc.

The wireless transmission module 43 and the network server 3 communicate with each other via 3G, 4G, 5G or WI-FI.

The second frame 465 further comprises a dialog box 469 showing a text message, "please say the place where the car is parked", to instruct the user to say the place where he parked his car.

The car relocation device 4 further comprises an acoustic module 47 capable of making a voice message, "please say the place where the car is parked", to instruct the user to say the place where he parked his car.

The second frame 465 further comprises a "never record the position" button 464. If the user presses the button 464, the wireless transmission module 43 will transmit "never record the position" data to the network server 3.

The method for car relocation according to the present invention further comprises a mobile device 2. The mobile device 2 can download the data stored n the network server 3. The user can find out the place where he parked the car according to the downloaded data. The mobile device 2 can be a smart phone or a tablet computer, etc.

The method for car relocation according to the present invention further comprises a micro management application for car relocation (find my car App), wherein the micro management application for car relocation is installed on the mobile device 2. The mobile device 2 can be a smart phone or a tablet computer, etc. When the mobile device 2, a mobile phone, starts the micro management application for car relocation, the mobile device 2 can download the data stored in the network server 3, so that the user can find our the place where he parked the car according to the downloaded data and the map.

The micro management application can be accessed by other people to search positions by modifying its settings, and the password and the period of validity thereof can be set. During the period of validity, the data stored in the network server 3 can be downloaded by inputting necessary data at the website of the network server 3 (such as the ID of the mobile device 2 or the number of the licensing plate) and password.

If the car is parked at the basement of a building, there will be no GPS signal. The prevent invention provides other compensation mechanisms to solve the above problem. If not detecting GPS signal, the car relocation device 4 will determine that the car is parked inside a building. When under ACC off, a warning voice message and a reminding screen, "please say the place where the car is parked", will pop up at the car relocation device 4 to instruct the user to say the place where he parked the car. For example, "B3, parking space D52". Finally, the GPS coordinate data and recorded sound data will be transmitted to the network server 3. When the user starts the micro management application for car relocation of the car relocation device 4, the application can not only transmit the GPS coordinate, but also can transmit voice file to the mobile device 2. After the user presses the button, the connected mobile device 2 (the last one connected mobile device 2) can download the place where the car was just parked without the need to input password. Further, other unauthorized mobile devices cannot find out the car; therefore, the present invention can also protect users' private information, which is very convenient for users.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A method for car relocation comprising the following steps:
   (a) providing a network server, an automobile device, and a mobile device, the automobile device having a screen capable of displaying a frame, the frame having a cancel button, a transmission button, and a cancel button, reporting data to a network server utilizing the automobile device and the mobile device, utilizing the automobile device and detecting whether an engine of a car is turned on, when the automobile device detecting the engine of the car is turned on, connecting the automobile device to the mobile device and transmitting an ID of the mobile device to the network server utilizing the automobile device, and proceeding to the next step;
   (b) when the automobile device detecting the engine of the car is turned off, transmitting GPS coordinate data to the network server via a wireless method utilizing the automobile device or the mobile device, and proceeding to the next step;
   (c) when the GPS coordinate data is provided, proceeding to the next step, and when the GPS coordinate data is not provided, displaying the frame showing a place where the car is parked utilizing a screen of the automobile device, wherein the frame having the cancel button, the transmission button and the record button, when the cancel button is pressed, the method ending; when the record button is pressed, the method proceeding to the next step;
   (d) when the GPS coordinate data is provided, proceeding to the next step, and when the GPS coordinate data is not provided, performing a sound recording utilizing the automobile device, wherein when the transmission button is pressed, the sound recording ending, and transmitting recorded sound data to the network server utilizing the automobile device or the mobile device via the wireless method, and proceeding to the next step; and
   (e) receiving the data transmitted by the automobile device or the mobile device in the network server and overwriting original data located in the network server.

2. The method of claim 1, wherein the step (c) further comprises the follow step:
   making a voice message utilizing the automobile device, the voice message being "please say the place where the car is parked".

3. The method of claim 1, wherein the step (c) further comprises the follow step:

displaying a dialog box showing a text message on the automobile device, the text message being "please say the place where the car is parked".

4. The method of claim 1, wherein the wireless method is selected from a group consisting of 3G, 4G, 5G and WI-FI.

5. The method of claim 1, wherein the mobile device capable of downloading the data stored in the network server.

6. The method of claim 1, further comprising a micro management application for car relocation, installing the micro management application for car relocation on the mobile device.

7. The method of claim 1, further comprising a micro management application for car relocation, allowing other people to access the micro management application for car relocation and to utilize the micro management application for car relocation to search positions by modifying settings, and setting a password and a period of validity of the access to the micro management application for car relocation.

* * * * *